United States Patent [19]

Hofmann et al.

[11] Patent Number: 5,744,210
[45] Date of Patent: Apr. 28, 1998

[54] NATURAL WOOD-COVERED PLASTIC PART SUCH AS A VEHICLE PART AND METHOD OF MANUFACTURING SAME

[75] Inventors: William G. Hofmann, Grosse Pointe Park; David J. Davis, Troy, both of Mich.

[73] Assignee: Larry J. Winget, Leonard, Mich.

[21] Appl. No.: 621,519

[22] Filed: Mar. 25, 1996

Related U.S. Application Data

[63] Continuation-in-part of Ser. No. 551,517, Nov. 1, 1995, abandoned.

[51] Int. Cl.$^6$ .................... B32B 5/12; B32B 21/04
[52] U.S. Cl. .............. 428/106; 156/182; 264/328.1; 264/511; 428/114; 428/537.1
[58] Field of Search ................. 156/182, 245, 156/309.6, 311, 324.4; 264/328.1, 511; 428/537.1, 425.1, 481, 514, 106, 114

[56] References Cited

U.S. PATENT DOCUMENTS 5,019,199  5/1991  Menke et al. ............... 264/328.1
5,423,933  6/1995  Horian ........................ 156/182

*Primary Examiner*—Michael Lusignan
*Attorney, Agent, or Firm*—Brooks & Kushman P.C.

[57] ABSTRACT

A natural wood-covered plastic part, such as a vehicle part, and a method of manufacturing same. The natural wood-covered plastic part includes a one-piece thermoplastic elastomeric body or structural substrate and a plastic-wood composite of a thermoplastic material compatible with the thermoplastic elastomer of the structural substrate. The plastic-wood composite and the plastic part are placed together at a bonding station. A bottom contact surface of the plastic-wood composite bonds with a front contact surface of the structural substrate between the contact surfaces thereof. The plastic-wood composite and the structural substrate may be bonded together in one of several ways, such as injection molding, compression molding and thermal or chemical bonding. The resulting plastic part is cooled beneath the softening point of both plastics so that a molecular concentration gradient is formed and an interface between the first and second plastics to bond the first and second plastics by diffusion within a mold cavity of a plastic mold separate from the mold cavity of a vacuum mold which is utilized to vacuum-mold the plastic-wood composite.

15 Claims, 5 Drawing Sheets

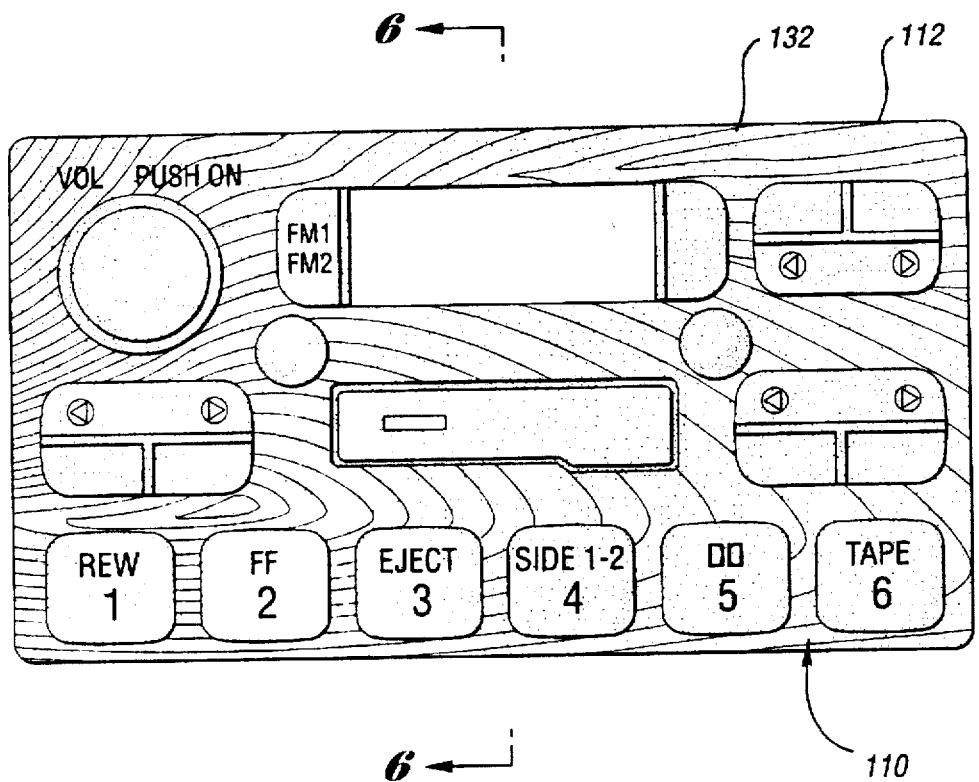
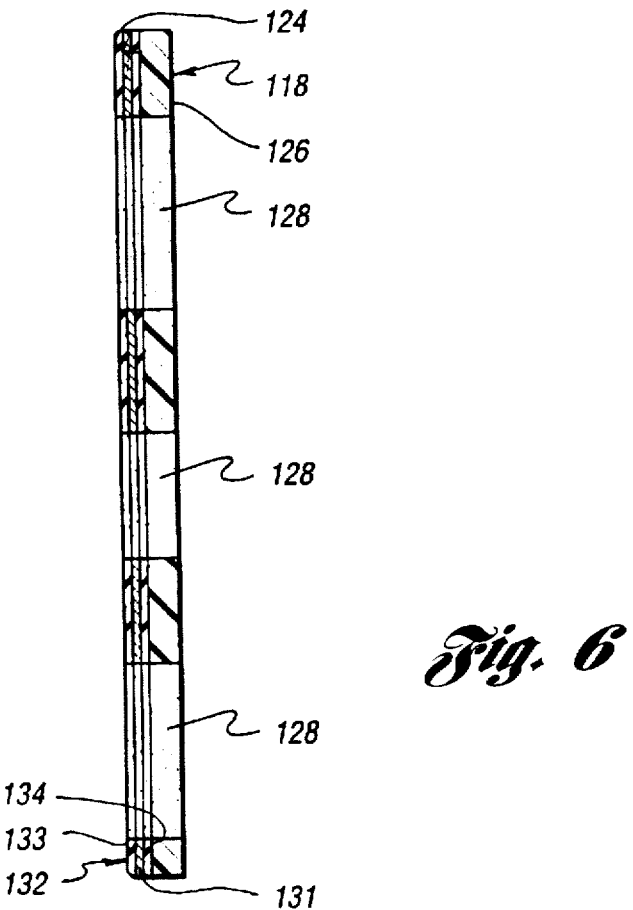

NATURAL WOOD-COVERED PLASTIC PART SUCH AS A VEHICLE PART AND METHOD OF MANUFACTURING SAME

CROSS-REFERENCE TO RELATED APPLICATION

This application is a continuation-in-part application of U.S. patent application Ser. No. 08/551,517, filed Nov. 1, 1995, entitled "Method of Manufacturing a Painted Vehicle Part", and now abandoned.

TECHNICAL FIELD

This invention relates to plastic parts and methods of manufacturing same and, in particular, to natural wood-covered plastic parts such as instrument panel trim and methods of manufacturing same.

BACKGROUND ART

Some plastic automotive parts are covered with wood trim after they are molded. Sometimes such plastic parts are composite plastic parts wherein an outer layer of the part is in-molded with a structural substrate of the part.

Recent practice in the automotive industry is utilization of all plastic fabricated parts, such as, but not limited to, instrument panels, interior trims, and door panels. It is known in other automotive parts areas that different, aesthetically pleasing outer surfaces enhance the overall appearance of the interior of automotive vehicles. Use of decorative appliques having wood grain finishes is often sought after.

Wood grain finishes are typically in the form of either simulated wood grain or genuine wood grain. The simulated wood grain finish may be achieved in one of several known manners: 1) backing a pre-printed film by a thin layer of a thermoplastic, such as polycarbonate, ABS (acrylonitrile/butadiene/styrene), or aluminum, followed by vacuum-forming to obtain the desired shape of the trim; 2) applying a lithograph on an aluminum sheet; and 3) dipping a substrate into a container of ink defining the wood grain appearance. Simulated wood grain finishes, however, are not as attractive as genuine wood grain finishes.

Genuine wood grain finishes may also be obtained in one of several known manners: 1) staining, sealing and protecting preformed laminates of wood having varying thicknesses which are then attached to a substrate via stapling, gluing, or any other similar attachment manner; 2) laminating an aluminum sheet with the genuine wood which is then welded or screwed onto a plastic part; and 3) adhesively bonding a thin laminate of wood to a pre-processed plastic substrate which is then stained and covered with a protective top-coat. Although the appearance of genuine wood is more attractive than simulated wood, the use of genuine wood is more expensive than that of simulated wood.

U.S. Pat. No. 5,423,933 discloses a method of producing a plastic-wood composite having the appearance of coated genuine wood.

DISCLOSURE OF THE INVENTION

An object of the present invention is to provide a natural wood-covered plastic part, such as a vehicle part.

In carrying out the above object and other objects, features and advantages of the present invention, a natural wood-covered plastic part is provided. The natural wood-covered plastic part includes a plastic-wood composite at least partially bonded together by naturally occurring lignin at a bond therebetween and formed into a preform having a predetermined shape. The natural wood-covered plastic part further includes a plastic structural substrate bonded to the bottom surface of the plastic-wood composite through sufficient heat and pressure but insufficient to break the bond at least partially provided by the naturally occurring lignin.

In further carrying out the above objects and other objects, features and advantages, of the present invention, a method is provided for manufacturing the natural wood-covered plastic part. The method includes the step of providing a plastic-wood composite at least partially bonded together by naturally occurring lignin at a bond therebetween and having top and bottom surfaces. The method also includes the step of forming the plastic-wood composite to a predetermined shape to obtain a preform. The method further includes the step of placing the preform and plastic together at a bonding station. The method finally includes the step of applying sufficient pressure and heat to bond the structural substrate to the bottom surface of the plastic-wood composite but insufficient to break the bond at least partially provided by the naturally occurring lignin so as to form the natural wood-covered plastic part.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 5 is a front elevational view of a second type of wood-covered plastic part adapted to be secured onto a radio bezel in a dashboard or instrument panel;

FIG. 6 is a sectional view of the air bag cover of FIG. 5 taken along lines 6—6 of FIG. 5;

BEST MODES FOR CARRYING OUT THE INVENTION

Figure 1:
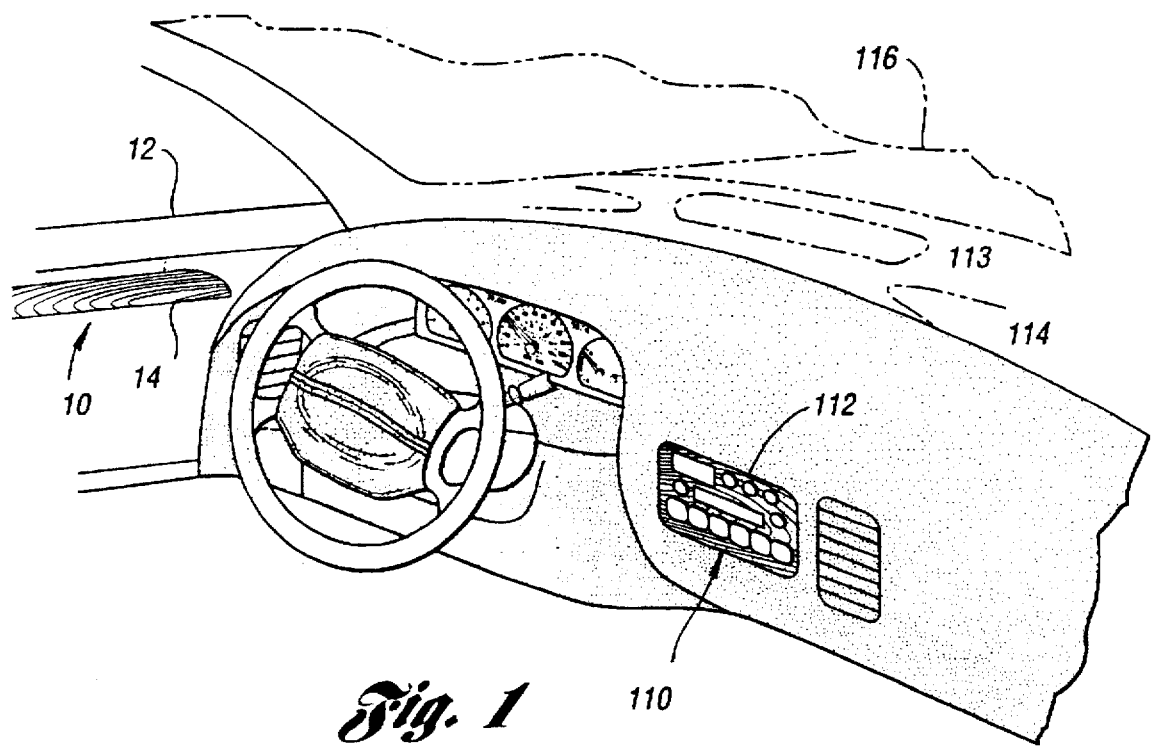
FIG. 1 is an environmental view showing two types of wood-covered plastic parts constructed in accordance with the method of the present invention.

Referring now to the drawing figures, there is illustrated in FIG. 1 an environmental view showing first and second embodiments of a wood-covered plastic part, generally indicated at 10 and 110, respectively, constructed in accordance with the method of the present invention. The wood-covered plastic part 10 includes an automotive door panel 12 having a wood-grain trim 14. The door panel may be either a driver's side door panel or a passenger side door panel.

The wood-covered plastic part 110 is a radio bezel 112 having a wood-grain finish typically mounted in a surface 113 of a dashboard or instrument panel, generally indicated at 114, located in underlying relationship to a sloped front windshield 116.

Figure 2:
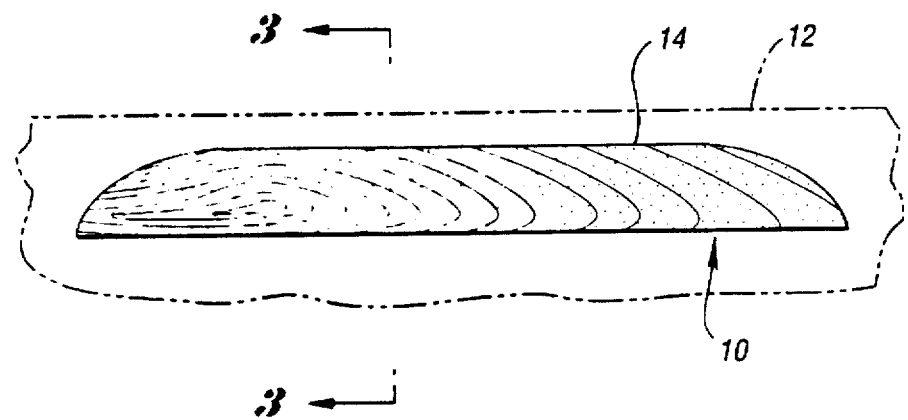
FIG. 2 is a front elevational view of one type of wood-covered plastic part to be included in an automotive door panel.
Figure 3:
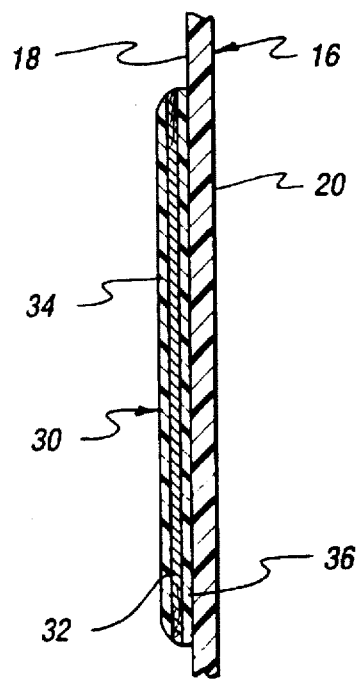
FIG. 3 is a sectional view of the wood-covered plastic part of FIG. 2 taken along lines 3—3 in FIG. 2.
Figure 7:
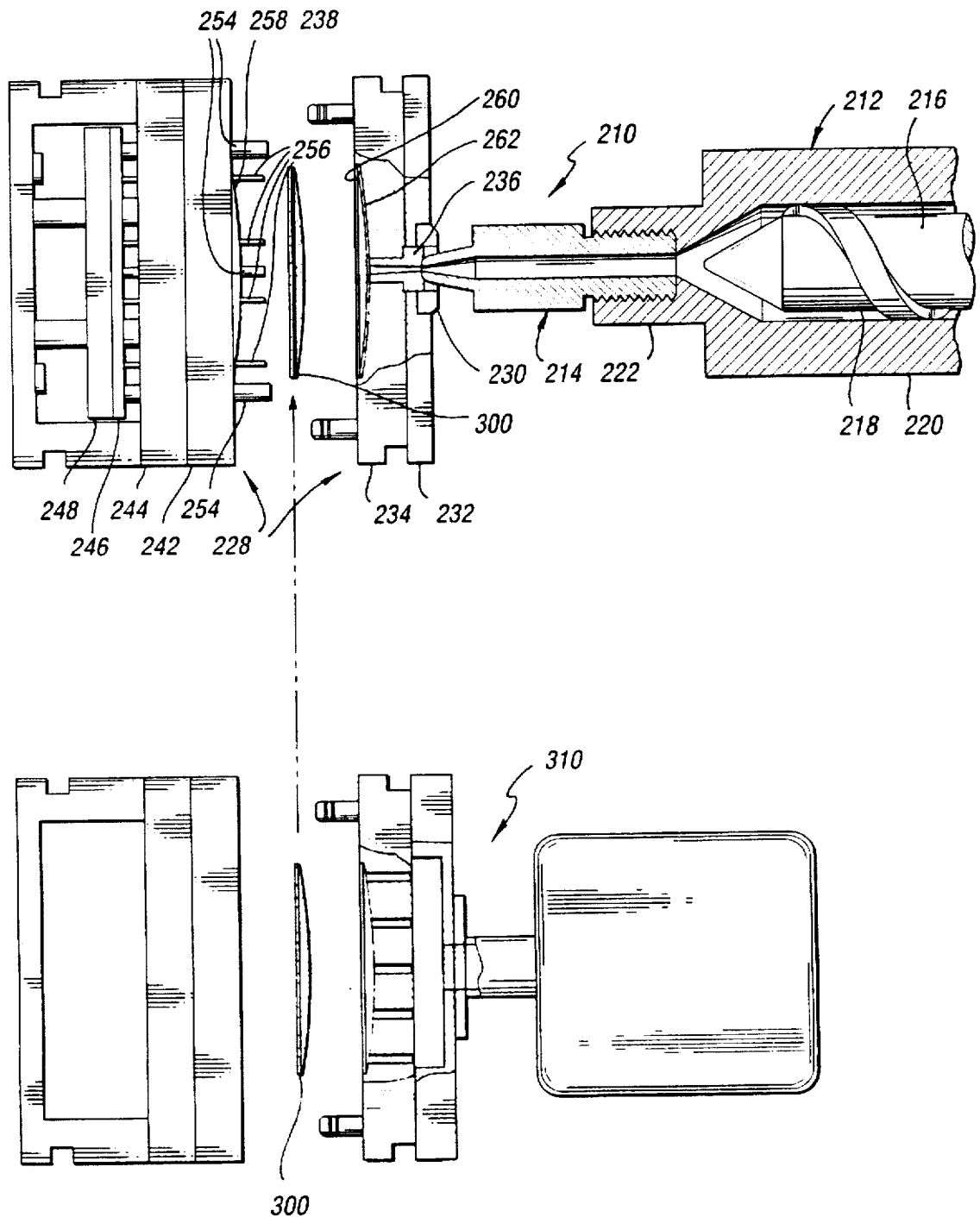
FIG. 7 is a schematic view of a conventional injection molding system and a conventional vacuum molding system which may be utilized to make the wood-covered plastic parts of the present invention.

Referring now to FIGS. 2-3, there is illustrated in detail the first embodiment of the wood-covered plastic part 10 constructed in accordance with the present invention. The wood-covered plastic part 10 includes a one-piece thermoplastic elastomeric body, generally indicated at 16, which is preferably injection molded in an injection mold (FIG. 7). The thermoplastic elastomeric body 16 includes a front contact surface 18 and a back contact surface 20.

As illustrated in FIG. 3, the wood-covered plastic part 10 also includes a wood grain trim 30 affixed thereon. The wood grain trim 30 comprises a wood veneer layer 32 sandwiched between a first plastic layer 34 and a second plastic layer 36, such as the type disclosed in U.S. Pat. No. 5,423,933. The wood veneer layer 32 is bonded to the first plastic layer 34 and the second plastic layer 36 by naturally occurring lignin at a bond therebetween. The second plastic layer 36 is manufactured from a flexible thermoplastic material that is compatible with the thermoplastic elastomer of the front contact surface 18. Thus, the wood grain trim 30 bonds by diffusion between the surfaces thereof and the injection mold. Yet, the bond between the wood grain trim 30 and the door panel 12 is insufficient to break the bond provided by the naturally-occurring lignin.

Figure 4:
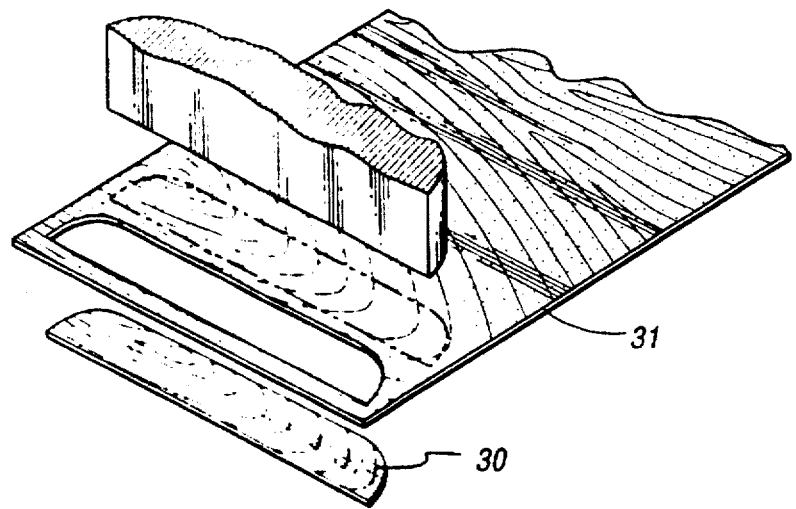
FIG. 4 is a perspective view illustrating a sheet of plastic-wood composite material being cut into predetermined shapes.

Referring now to FIG. 4, the preferred method includes providing a plastic-wood composite having top and bottom surfaces 34 and 36, respectively. The plastic-wood composite may be provided in the form of sheet stock. In this case, the plastic wood composite material 31 is die-cut into a predetermined shape forming the decorative trim 30. The decorative trim 30 is then conventionally vacuum-formed into a shape corresponding to the shape of the plastic part to be covered. The decorative trim 30 is then placed in an article-defining cavity of a mold (FIG. 7) shaped correspondingly to the plastic part, such as the door panel 12. Plastic is then injected into the mold cavity and the decorative trim 30 is then bonded onto the door panel 12.

Referring now to FIGS. 5-6, there is illustrated a second embodiment of the wood-covered plastic part 110 constructed in accordance with the present invention. The wood-covered plastic part 110 also includes a one-piece thermoplastic elastomeric body, generally indicated at 118, which is injection molded in an injection mold (FIG. 7). The body 118 also includes a front contact surface 124 and a back surface 126. The body 118 includes holes 128 which are adapted to receive radio controls, such as a display, rotary knobs and push-buttons.

The wood-covered plastic part 110 also includes a wood grain trim, generally indicated at 132, which is vacuum molded in a vacuum mold (FIG. 7) from a thermoplastic material compatible with the thermoplastic elastomer of the body 118. The wood grain trim 132 comprises a wood veneer layer 131 sandwiched between a first plastic layer 133 and a second plastic layer 134, such as the type disclosed in U.S. Pat. No. 5,423,933. The second layer 134 bonds with the front contact surface 124 of the body 118 by diffusion between the contact surfaces thereof and the injection mold (FIG. 7).

Preferably, the thermoplastic elastomer of the body 118 is TPO (thermoplastic polyolefin), polyester or similar thermoplastic and the corresponding thermoplastic material of the second layer 134 of the wood grain trim 132 is PVC (polyvinyl chloride), urethane, or similar thermoplastic.

Referring now to FIG. 7, there is illustrated a conventional injection molding system, generally indicated at 210, and a conventional vacuum molding system, generally indicated at 310, for collectively making a wood-covered plastic part (either 10 or 110) of the present invention.

Briefly, the injection molding system 210 includes an injection molding machine, generally indicated at 212, having a nozzle, generally indicated at 214, for injecting predetermined amounts or shots of molten resin. The injection molding machine 212 includes a hydraulic screw ram 216 which is disposed in a bore 218 formed in a barrel 220 of the injection molding machine 212. The ram 216 plasticizes and advances resin towards the nozzle 214. Upon complete plasticization of the resin, the screw ram 216 is hydraulically advanced towards threaded portions 222 of the barrel 220 to inject molten plastic through the nozzle 214, as is well known in the art.

The system 210 also includes a mold or mold body generally indicated at 228. As illustrated in FIG. 71 the mold 220 comprises a two-plate mold body. One of the plates includes a locating ring 230 for locating the injection end of the nozzle 214. The locating ring 230 is mounted on a clamp plate 232 which, in turn, is fixably connected to a cavity retainer plate or cavity plate 234. A sprue bushing 236 is disposed within the locating ring 230 and is supported by the clamp plate 232. Leader pins 238 on the cavity plate 234 provide the male half of the male-female connection of the first plate with the second plate of the two-plate mold 228. In particular, the second plate includes leader pin bushings (not shown) which slidably receive and retain the leader pins therein in the closed position of the mold 228. The leader pin bushings are retained within a core retainer plate 242. The core retainer plate 242 is fixably connected to a support plate 244 which in turn is connected to an injector retainer plate 246. The injector retainer plate 246 is connected to an injector plate 248 which, in turn, is supported by support pillars 250. Support plate 244 is also fixably connected to the ends of a U-shaped ejector housing 252 to which the support pillars 250 are also connected. The plate 246 supports a plurality of return pins 254 and ejector pins 256 which extend toward the plate 234 and through the plates 242 and 244. The ejector pins 256 are provided for ejecting particular injection molded part(s) from the mold 228.

Opposing surfaces of male and female mold parts 258 and 260 respectively define a mold cavity 262. The mold part 258 is supported on the plate 242 and the mold part 260 is supported on the cavity retainer plate 234.

As illustrated in FIG. 7, there is shown how a one-piece wood grain trim 300 is first vacuum molded in the vacuum molding system 310 and then placed in the mold cavity 262. Thereafter, the body or structural substrate is molded in the plastic injection molding system 210 to form a completed wood-covered plastic part wherein the one-piece wood grain trim 300 is bonded to the body.

Figure 8:
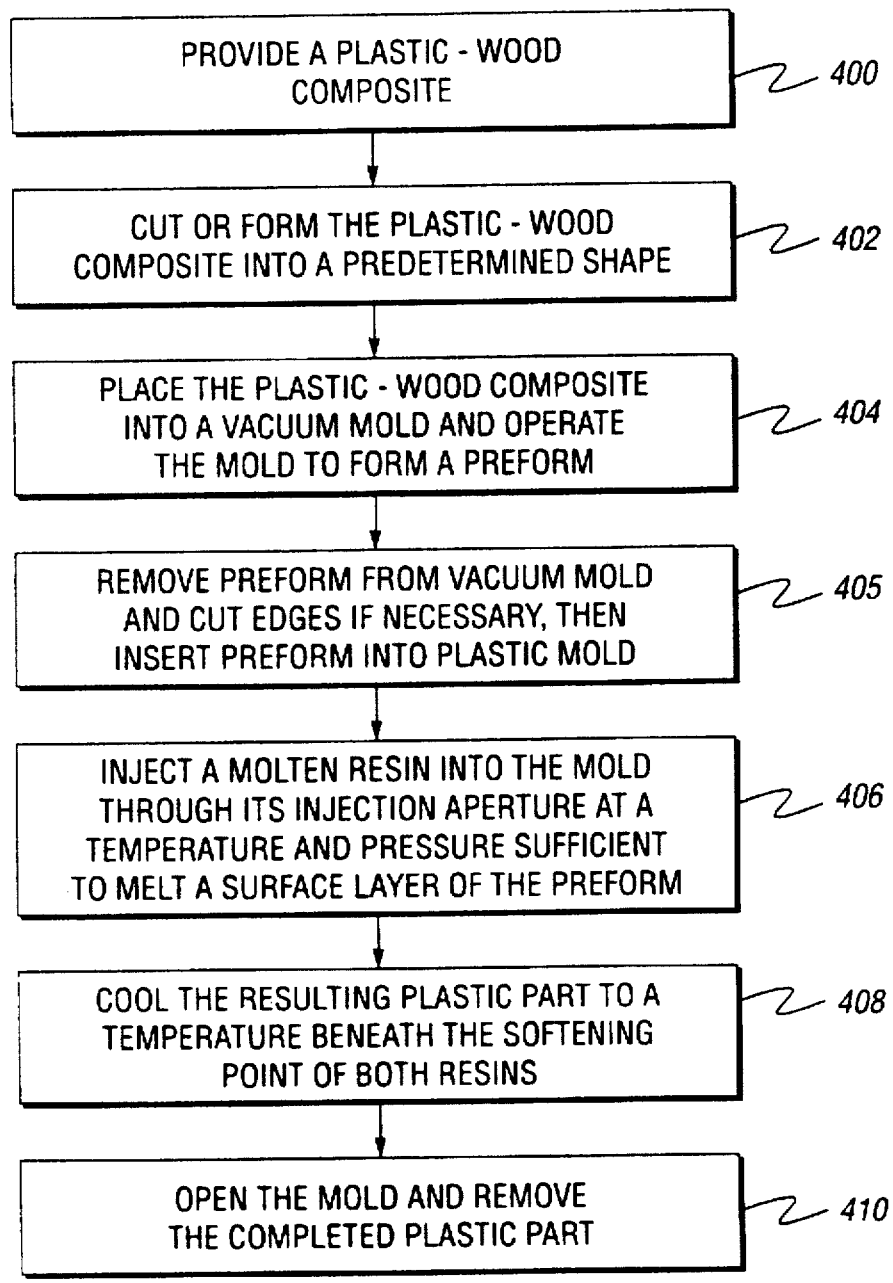
FIG. 8 is a block diagram flow chart illustrating the various method steps taken to practice the method of the present invention in order to make the wood-covered plastic parts.

Referring now to FIG. 8, there is illustrated the various process steps of the method of the present invention.

At block 400, provide a plastic-wood composite material. At block 402, the plastic-wood composite is either cut or formed into a predetermined shape.

At block 404, place the plastic-wood composite into a vacuum mold and operate the mold to form a preform.

At block 405, open the vacuum mold, remove the preform from the vacuum mold and cut edge portions of the preform if necessary. Then, insert the preform into a plastic mold.

At block 406, insert a molten resin into a mold cavity of the plastic mold through its injection aperture at a temperature and pressure sufficient to melt a bottom surface layer of the preform.

At block 408, cool the resulting plastic part to a temperature beneath the softening point of both resins.

Finally, at block 410, the plastic mold is opened and the completed plastic part is removed.

In this way, a one-piece TPO polyester-type plastic or similar thermoplastic substrate is molded with a wood-covered preform formed in a vacuum molding system. After this procedure, the substrate and the wood-covered preform are bonded through the thermoplastic injection process to produce a plastic part having a wood trim.

The body 16 or 118 of the wood-covered plastic part 10 or 110, respectively, may also be formed from polypropylene, TPO (thermoplastic olefin), TPU (thermoplastic urethane) or other similar thermoplastic. The corresponding plastic-wood veneer composite 30 or 132 must be compatible with the plastic of the front contact surface 16 or 118 so that diffusion (i.e., bonding) between contact surfaces occurs.

The plastic-wood composite may be bonded to the plastic substrate in any one of several processes, such as reaction injection molding, compression molding, bonding or gluing. If compression molding is utilized, is a sheet of plastic is placed into a corresponding mold cavity and pressure and heat is added to harden and set the completed natural wood-covered plastic part. In the case of bonding, either thermal bonding, in which heat is generated through vibration to bond the plastic to the plastic-wood composite, or chemical bonding, in which a chemical is added to bond the two components to each other, may be utilized.

It should be understood that the plastic-wood composite can be positioned in the injection mold either by way of preform, as described above, or by way of a film roll supply. Furthermore, the plastic substrate may be in the form of an automotive trim panel, interior trim, door panel, furniture, gun stock, etc.

The unique features of a wood-covered plastic part utilizing a plastic-wood composite are:

i) reduced cost due to reduction in amount of wood utilized, elimination of processing required to treat and form genuine wood, and elimination of need of carrier film and secondary process of attaching carrier film to genuine wood prior to bonding to plastic part;

ii) freedom of styling in designing various substrates such as, automotive vehicle instrument panel and instrument panel trim, automotive vehicle trim, automotive door panels, exterior moldings, furniture, and gun stocks;

iii) weight savings due to reduction in amount of wood utilized and elimination of glass filling required in genuine wood substrate;

iv) increased durability of the plastic part; and v) improved CTE (Coefficient of Thermal Expansion) performance due to integral thermoplastic backing.

While the best modes for carrying out the invention have been described in detail, those familiar with the art to which this invention relates will recognize various alternative designs and embodiments for practicing the invention as defined by the following claims.

What is claimed is:

1. A natural wood-covered plastic part comprising:

a plastic-wood composite having a wood veneer layer disposed between a first plastic layer and a second plastic layer, the composite at least partially bonded together by naturally occurring lignin at a bond between each of the first and second plastic layers and the wood veneer layer and formed into a preform having a predetermined shape, the plastic-wood composite having a top and bottom surface; and a plastic structural substrate bonded to the bottom surface of the plastic-wood composite through sufficient heat and pressure but insufficient to break the bonds at least partially provided by the naturally occurring lignin so as to form the natural wood-covered plastic part.

2. The natural wood-covered plastic part as recited in claim 1 wherein the plastic structural substrate is bonded to the bottom surface of the plastic-wood composite by introducing plastic into a mold cavity defining the shape of the plastic part.

3. The natural wood-covered plastic part as recited in claim 1 wherein the plastic is introduced by injecting the plastic into the mold cavity.

4. The natural wood-covered plastic part as recited in claim 1 wherein the plastic is introduced by placing a sheet of plastic into the mold cavity.

5. The natural wood-covered plastic part as recited in claim 1 wherein the plastic-wood composite is formed into a preform utilizing a vacuum mold.

6. A method of manufacturing a natural wood-covered plastic part comprising:

providing a plastic-wood composite having a wood veneer layer disposed between a first plastic layer and a second plastic layer, the composite at least partially bonded together by naturally occurring lignin at a bond between each of the first and second plastic layers and the wood veneer layer and having top and bottom surfaces;

forming the plastic-wood composite to a predetermined shape to obtain a preform;

placing the preform and plastic together at a bonding station; and applying sufficient pressure and heat to bond the plastic to the bottom surface of the plastic-wood composite but insufficient to break the bonds at least partially provided by the naturally occurring lignin so as to form the natural wood-covered plastic part.

7. The method as recited in claim 6 wherein the step of placing includes the step of introducing plastic into a mold cavity having a shape defining the plastic part to generate a structural substrate for the plastic part.

8. The method as recited in claim 7 wherein the step of introducing includes the step of injecting plastic into the mold cavity.

9. The method as recited in claim 7 wherein the step of introducing includes the step of placing a sheet of plastic into the mold cavity.

10. The method as recited in claim 9 wherein the plastic is bonded to the bottom surface of the plastic-wood composite utilizing compression molding.

11. The method as recited in claim 9 wherein the plastic is bonded to the bottom surface of the plastic-wood composite utilizing thermal bonding.

12. The method as recited in claim 9 wherein the plastic is bonded to the bottom surface of the plastic-wood composite utilizing chemical bonding.

13. The method as recited in claim 6 wherein the step of providing includes the step of providing a sheet of the plastic-wood composite and further comprising the step of cutting the plastic-wood composite prior to the step of forming.

14. The method as recited in claim 6 wherein the step of forming includes the step of placing the plastic-wood composite in a mold cavity of a vacuum mold is having a shape defining the preform.

15. The method as recited in claim 6 further comprising the step of bonding a painted film carrier onto a top surface of the plastic part prior to placing the preform and the plastic together.

\* \* \* \* \*